United States Patent
Clevers et al.

(10) Patent No.: US 8,857,602 B2
(45) Date of Patent: Oct. 14, 2014

(54) BELT ADJUSTING METHOD AND BELT TRANSPORT SYSTEM

(71) Applicant: OCE-Technologies B.V., Venlo (NL)

(72) Inventors: Ernest J. J. Clevers, Broekhuizenvorst (NL); Patrick Vink, Broekhuizenvorst (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 13/839,166

(22) Filed: Mar. 15, 2013

(65) Prior Publication Data

US 2013/0206549 A1  Aug. 15, 2013

Related U.S. Application Data

(63) Continuation of application No. PCT/EP2011/066839, filed on Sep. 28, 2011.

(30) Foreign Application Priority Data

Oct. 7, 2010  (EP) .................................. 10186851

(51) Int. Cl.
- *B65G 39/16* (2006.01)
- *G03G 15/16* (2006.01)
- *G03G 15/00* (2006.01)
- *B65G 15/64* (2006.01)

(52) U.S. Cl.
CPC ............... *B65G 15/64* (2013.01); *B65G 39/16* (2013.01); *G03G 15/167* (2013.01); *G03G 2215/00156* (2013.01); *G03G 15/755* (2013.01)
USPC .......................... 198/807; 198/810.03; 226/21

(58) Field of Classification Search
USPC .......... 198/806, 807, 810.01, 810.03; 226/15, 226/18, 19, 20, 21, 22, 23
See application file for complete search history.

(56) References Cited

U.S. PATENT DOCUMENTS

| | | | | |
|---|---|---|---|---|
| 3,090,534 A | * | 5/1963 | Frommer et al. | 226/21 |
| 3,244,340 A | * | 4/1966 | Fife et al. | 226/22 |
| 4,582,235 A | * | 4/1986 | Schulz | 226/20 |
| 5,397,043 A | * | 3/1995 | Blanding | 226/21 |
| 6,496,672 B2 | * | 12/2002 | Asuwa et al. | 399/165 |
| 6,584,900 B2 | * | 7/2003 | DeVroome | 101/228 |
| 6,594,460 B1 | | 7/2003 | Williams et al. | |
| 8,326,162 B2 | * | 12/2012 | DeJong et al. | 399/36 |
| 2010/0080598 A1 | | 4/2010 | Nakazato | |

FOREIGN PATENT DOCUMENTS

| | | |
|---|---|---|
| EP | 2 073 066 A1 | 6/2009 |
| JP | 2008-007246 A | 1/2008 |

* cited by examiner

*Primary Examiner* — William R Harp
(74) *Attorney, Agent, or Firm* — Birch, Stewart, Kolasch & Birch, LLP

(57) ABSTRACT

A method of adjusting a lateral position of an endless belt that is passed around at least two rollers, comprising the steps of: controlling a tilt position of a first roller of the at least two rollers; and adjusting a lateral position of the first roller, wherein the lateral position of the first roller is adjusted in combination with controlling the tilt position of the first roller.

18 Claims, 4 Drawing Sheets

BELT ADJUSTING METHOD AND BELT TRANSPORT SYSTEM

CROSS-REFERENCE TO RELATED APPLICATIONS

This application is the Continuation of PCT International Application No. PCT/EP2011/066839 filed on Sep. 28, 2011, which claims priority under 35 U.S.C. §119(a) to Patent Application No. 10186851.1 filed in Europe on Oct. 7, 2010, all the above documents are hereby expressly incorporated by reference into the present application.

FIELD OF THE INVENTION

The invention relates to a method of adjusting a lateral position of an endless belt that is passed around at least two rollers, comprising controlling a tilt position of at least one of the rollers.

BACKGROUND ART

When an endless belt, e. g. a conveyor belt is continuously driven to move along a transport path that is defined by the rollers, manufacturing tolerances in the rollers and the bearing structures thereof as well as external influences may cause a tendency of the belt to move not only in longitudinal direction of the transport path but to move also in lateral direction, i.e. in axial direction of the rollers.

In order to suppress such lateral movements of the belt, it is known, e.g. from JP 2008-007246 A, to monitor the lateral position of the belt by means of a belt edge detector and to feedback-control the lateral movements of the belt by adjusting a tilt position of one of the rollers. When the roller is tilted about an axis that is normal to the axis of rotation of this roller, this has an effect on the direction of belt transport, so that the belt may be "steered" by appropriately controlling the tilt angle of the roller.

US 2010/0080598 A1 describes a belt adjusting mechanism wherein a lateral shift position of a transfer belt is changed in a belt shift direction perpendicular to the belt conveyance direction by changing an inclination angle of a shift control roller.

EP 2 073 066 A1 describes a similar mechanism. A correction roller is tilted by moving one end up and down.

U.S. Pat. No. 6,594,460 B1 describes a belt adjusting mechanism wherein the lateral position of the belt is adjusted by means of belt edge guides that engage the edges of the belt and are movable in axial direction of the rollers.

In certain applications, e.g. in high resolution print applications where image substrate sheets are supported on the endless belt and are conveyed past a processing stage, e.g. a print head, or the endless belt itself serves as an image carrier, it is important that the lateral position of the belt is controlled with very accuracy.

SUMMARY OF THE INVENTION

It is therefore an object of the invention to improve the accuracy in controlling the lateral position of an endless belt.

According to the invention, this object is achieved by a method of adjusting a lateral position of an endless belt that is passed around at least two rollers, comprising the steps of: controlling a tilt position of a first roller of the at least two rollers; and adjusting a lateral position of the first roller, wherein the lateral position of the first roller is adjusted in combination with controlling the tilt position of the first roller.

Thus in the method according to present invention this object is achieved by controlling the lateral position of at least one of the rollers in combination with controlling the tilt position of the same roller.

When the tilt position of a roller is changed in order to correct the lateral position of the belt, the main effect is a change in the lateral velocity of the belt, and this change in the lateral velocity will result in the desired change of the lateral position only with a certain delay, so that the feedback control tends to be unstable and does not permit the required high accuracy. On the other hand, when the lateral position of a roller is changed, this has an immediate effect on the lateral position of the belt at least in the portions in the vicinity of this roller. Consequently, lateral deviations of the belt from its target position can be corrected with very short delay times by adjusting the lateral position of one or more rollers. Of course, the lateral positions of the rollers can only be adjusted within a certain range, and when the belt has a tendency to drift in a certain lateral direction, the rollers will sooner or later reach the end of their adjustment range. However, by combining the lateral adjustment of the rollers with the steering effect achieved by controlling the tilt position of at least one roller, it is possible to assure the long-term stability of the lateral belt position by controlling the tilt position and to compensate short-term deviations in the lateral belt position by controlling the lateral position of one or more rollers.

Useful optional features of the invention are indicated in the dependent claims.

In an embodiment of the method, the method further comprising the step of: adjusting a lateral position of a second roller of the at least two rollers.

In order to control the lateral position of the belt in a belt section between two rollers, it will be preferable when the lateral positions of both rollers are adjusted, so as to avoid any skew in the images conveyed on the belt.

In an embodiment of the method, the method comprising the steps of: detecting a lateral position of an edge of the belt by means of a belt edge detector; and feedback-controlling the lateral position of the belt by adjusting both, the tilt position and the lateral position of the first roller of the at least two rollers.

In an embodiment of the method, wherein the lateral positions of the first roller and the second roller are controlled synchronously.

In an embodiment of the method, wherein the first roller of the rollers is tilted about a tilt axis (38) that is arranged offset relative to the axis of rotation of the first roller towards a line where the belt leaves the peripheral surface of the first roller.

In an embodiment of the method, wherein the first roller is tilted by adjusting the positions of bearings at opposite ends of the first roller in a direction (y) in parallel with the axis of rotation of that roller and in a direction (z) that is orthogonal to the tilt axis.

When the belt is steered by controlling the tilt position of a roller, the tilt movement may result in a lateral shift in the belt position, and this lateral shift may cause an error in the lateral belt adjustment. In order to avoid such errors, the lateral adjustment of the roller may be used for compensating the lateral shift that is brought about by the tilt movement, or the roller may be tilted about an axis that does not pass through the axis of rotation of the roller but is shifted towards a "separation line" where the belt leaves peripheral surface of the roller.

In an embodiment of the method, wherein a detection signal of belt edge detector is integrated and/or averaged and/or filtered before it is used for controlling the tilt position of the first roller of the at least two rollers.

In an embodiment of the method, wherein the detection signal of the belt edge detector is corrected for irregularities in the shape of the belt edge before the signal is used for adjusting the lateral position of the first roller of the at least two rollers.

When the belt position is feedback-controlled by means of a belt edge detector, errors in the control process may be induced by the fact that the edge of the belt is not perfectly straight. Preferably, these errors are avoided by storing, e.g. in the form of a table, a curve indicating the lateral position of the belt edge as a function of the longitudinal position along the belt, so that the position of an "ideal", perfectly straight belt edge can be obtained by subtracting the function value from the measurement result obtained from the belt edge detector for the pertinent longitudinal position.

In an embodiment of the method, the method comprising the steps of: determining periodic fluctuations in the lateral position of the first roller and/or the belt with a periodicity corresponding to the rotation of the first roller; and controlling the lateral position of the first roller for compensating these fluctuations.

In an embodiment of the method, the method comprising the steps of: determining periodic fluctuations in the lateral position of the second roller and/or the belt with a periodicity corresponding to the rotation of the second roller; and controlling the lateral position of the second roller for compensating these fluctuations.

Periodic fluctuations in the lateral position of the belt may also be caused by manufacturing tolerances in the bearings of the rollers. Since these periodic fluctuations can be determined (measured) in advance, it is possible to compensate for these fluctuations by feedforward-controlling the tilt position and/or (more preferably) the lateral position of the roller or rollers.

The invention also relates to a belt transport system comprising a belt passed around at least two rollers, and an adjusting mechanism for adjusting the lateral position of the belt in a direction (y) parallel with the axes of rotation of the rollers, said adjusting mechanism comprising a mechanism for tilting a first roller of the at least two rollers about an axis that is orthogonal to the axis of rotation of that roller, wherein the adjustment mechanism further comprises an actuator for adjusting the lateral position of at the first roller in said direction (y) in parallel with the axes of rotation of the rollers.

In an embodiment of the belt transport system, wherein the adjusting mechanism is adapted to tilt said first roller about a tilt axis that is arranged offset from the axis of rotation of the first roller towards a line where the belt leaves the peripheral surface of the first roller.

In an embodiment of the belt transport system, wherein the adjusting mechanism comprises actuators for moving bearings at opposite ends of the first roller of the at least two rollers independently of one another in a direction (z) that is orthogonal to the tilt axis.

In an embodiment of the belt transport system, wherein the adjusting mechanism further comprises an actuator for adjusting the lateral position of a second roller of the at least two rollers in said direction (y) in parallel with the axes of rotation of the rollers.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

Embodiments of the invention will now be described in conjunction with the drawings, wherein.

DETAILED DESCRIPTION OF THE DRAWINGS

Figure 1:
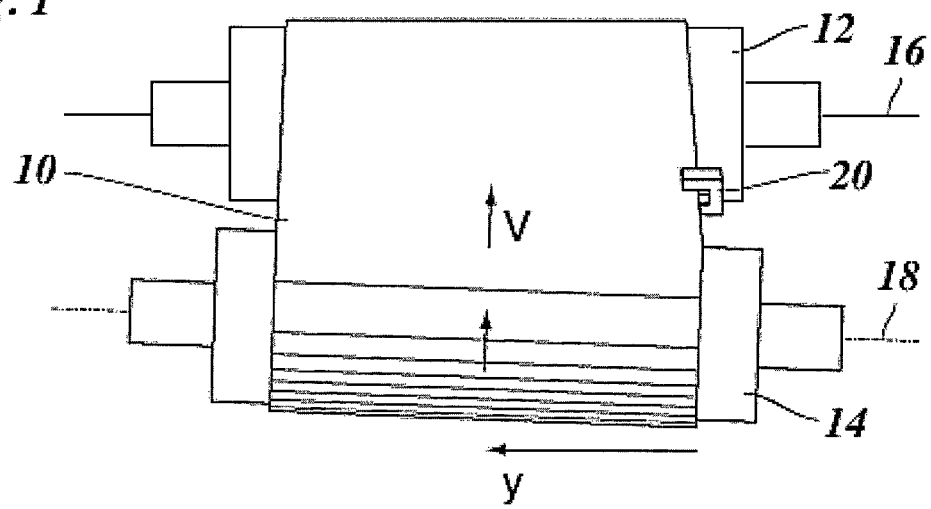
FIG. 1 is a perspective front view of a belt transport system according to the invention.

The present invention will now be described with reference to the accompanying drawings, wherein the same reference numerals have been used to identify the same or similar elements throughout the several views.

As is shown in FIG. 1, a belt transport system comprises an endless belt 10 that is passed around two rollers 12, 14. The roller 12 is rotatable about an axis 16, and the roller 14 is rotatable about an axis 18 that is substantially parallel with the axis 16. At least one of the rollers 12, 14 is driven by a motor (not shown), so that the belt 10 is moved in the direction indicated by an arrow V in FIG. 1.

The direction in which the belt 10 moves can be influenced by slightly tilting the roller 14 about an axis that is perpendicular to the axis of rotation 18 (e. g. normal to the plane of the drawing in FIG. 1). When the roller 14 is held in the tilted position shown in FIG. 1, the belt 10 will tend to move gradually towards the right ends of the rollers 12, 14.

A belt edge detector 20 detects the lateral position (i.e. the position in the direction of the axes 16, 18) of one edge of the belt 10, so that the lateral position of the belt may be feedback-controlled.

When the belt edge detector 20 detects a lateral deviation of the belt edge from a target position, a control signal is sent to an actuator in a bearing structure for the roller 14, and the roller is tilted so as to return the belt to the target position. However, the main effect of a tilted position of the roller 14 is that a velocity component in the lateral direction (y) is imparted to the part of the belt 10 that leaves the peripheral surface of the roller 14. Consequently, the effect of the control operation is detectable at the detector 20 only with the certain delay.

Figure 2:
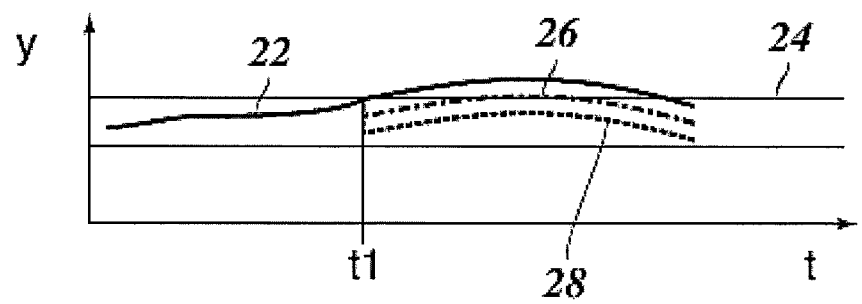
FIG. 2 is a diagram illustrating effects of different control operations on the lateral position of a belt.

By way of example, a curve 22 shown in continuous lines in FIG. 2 indicates the lateral position of the belt edge detected by the belt edge detector 20 as a function of the time t. Further shown is a tolerance corridor 24 for the belt edge. At a time t1, the belt edge leaves the tolerance corridor 24, so that a control operation should be initiated. When this control operation consists only in tilting the roller 14 as shown in FIG.

1, this will only reduce the speed with which the belt edge moves to the left in FIG. 1, and the curve 22 will nevertheless leave the tolerance corridor 24 as shown in FIG. 2.

According to the invention, the tilt movement of the roller 14 is combined with an adjustment of the lateral position of the roller 14 or both rollers 12, 14.

Figure 3:
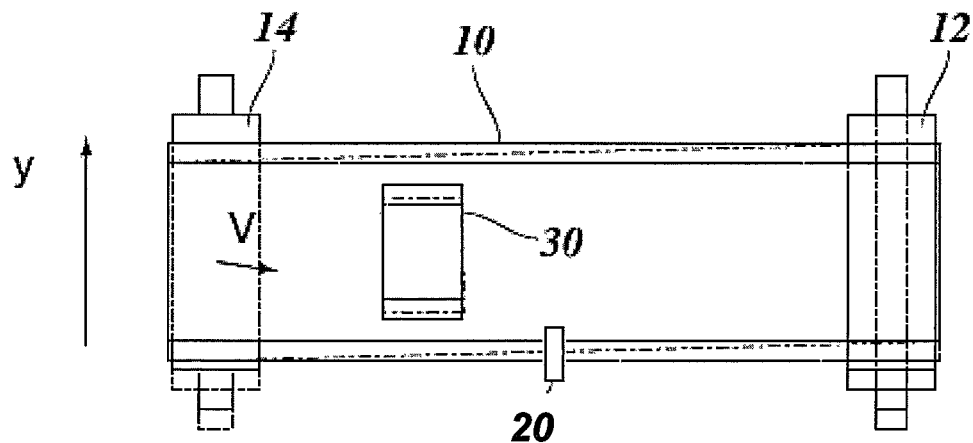
FIG. 3 is a top plan view of the belt transport system.

In FIG. 3, the effect of a certain lateral displacement (in negative y-direction) of only the roller 14 on the lateral position of the belt 10 has been illustrated in dot-dashed lines. The corresponding change in the detection signal of the belt edge detector 20 is indicated by the curve 26 in FIG. 2. It can be seen that the adjustment of the lateral position of the roller 14 has an immediate effect on the position of the belt edge at the location of the belt edge detector 20, i.e. the control operation becomes effective practically without delay.

When the lateral position of both rollers 12, 14 is shifted by the same amount, the resulting effect is shown in dashed lines in FIG. 3 and is indicated by the curve 28 in FIG. 2.

FIG. 3 further shows one of a plurality of sheets 30 that are conveyed on the belt 10. Again, the effect of a lateral shift of only the roller 14 or of both rollers 12, 14 on the sheet 30 has been indicated in dot-dashed lines and dashed lines, respectively. When the roller 14 is shifted alone, the sheet 30 is not only shifted laterally by an amount that depends upon the longitudinal position of the sheet relative to the rollers 12, 14, but is also subject to a rotation by a certain skew angle. This skew angle may however be negligible when the distance between the two rollers 12, 14 is large.

In a preferred embodiment, both rollers 12, 14 are shifted by the same amount, so that the sheets 30 are displaced in parallel to themselves and always by the same amount, irrespective of the longitudinal position on the belt. In this way, the lateral positions of the belt 10 and of the sheets 30 conveyed thereon can be controlled stably and with high accuracy.

Since the roller 14 is not only shifted in lateral direction but is also tilted (as shown in FIG. 1), the velocity of the belt 10, indicated by the arrow V in FIG. 3, gets a component in negative Y-direction, and in the long run, this velocity component will cause the belt edge to move in the same direction, so that the rollers 12, 14 may after a while be returned to their original lateral positions.

Figure 4:
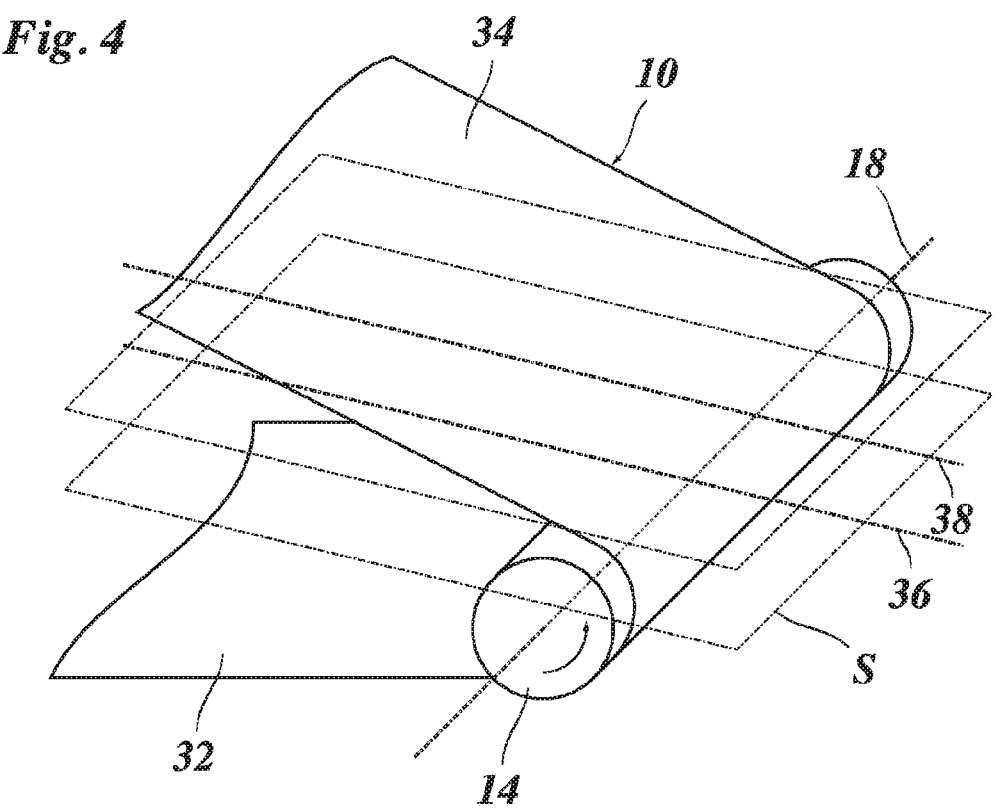
FIG. 4 is a perspective view of a portion of a belt passed around a roller.

FIG. 4 is a perspective view of the roller 14, showing also an ingoing section 32 and an outgoing section 34 of the belt 10. In this example, the belt 10 is passed around more than two rollers, so that the ingoing and outgoing sections 32, 34 of the belt are not parallel to one another. FIG. 4 further shows a plane S which is a plane of symmetry that passes through the axis of rotation 18 of the roller 14 and is oriented such that, relative to this plane S, the outgoing section 34 of the belt is the mirror image of the ingoing section 32.

In order to change the direction of movement of the outgoing section 34 of the belt, the roller 14 may be tilted about any axis that is perpendicular to the axis of rotation 18. When the tilt axis is perpendicular to the plane S, however, this will induce a difference in length between the left and right edges of the belt, so that the belt would have to have a certain elasticity. On the other hand, when the tilt axis is parallel to the plane S, the tilt movement will cause no substantial changes in the length of the belt.

Figure 5:
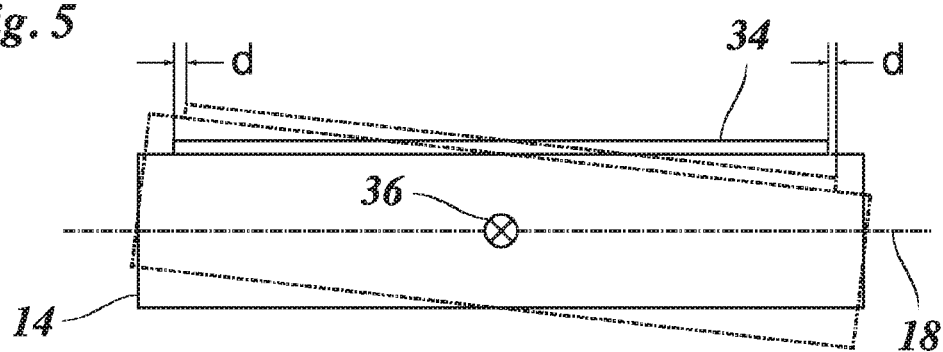
FIGS. 5 and 6 are schematic views illustrating the effects of different tilt movements of the roller shown in FIG. 4.

FIG. 5 shows a front view of the roller 14 and the outgoing belt section 34 in both, a tilted and a non-tilted condition and illustrates a case where the roller 14 is tiltable about an axis 36 that is included in the plane of symmetry S and, consequently, intersects the axis of rotation 18 of the roller. In this case, the tilt movement of the roller induces a certain lateral shift of the edges of the belt section 34 by a distance d. This shift will immediately translate into a shift of the belt edge at the belt edge detector 20, so that the belt edge detector delivers a negative feedback to the control system, and this may cause errors and instabilities in the control system.

Figure 6:
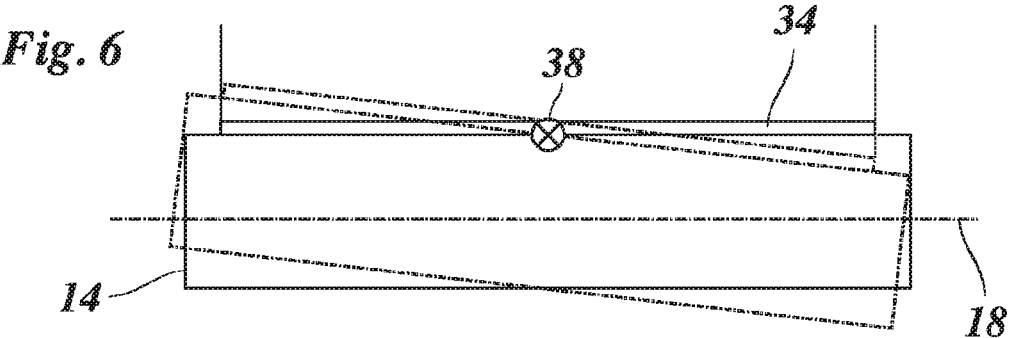

This problem can be avoided by tilting the roller 14 about a tilt axis 38 that is offset from the plane of symmetry S towards the top apex of the roller 14, as shown in FIG. 6. In FIG. 6, rather than intersecting the axis of rotation 18, the tilt axis 38 intersects a line on the peripheral surface of the roller 14 where the outgoing section 34 of the belt leaves the roller. In this case, the shift movement does not induce any significant lateral shift of the belt, as can be seen in FIG. 6. Thus, by selecting the tilt axis 38 as in FIG. 6, the stability and accuracy of the control system can be improved.

In order for the roller 14 to be rotatable about the offset tilt axis 38, a kind of Cardanic suspension may be used, i.e. the entire roller 14 may be rotatably supported in a rig that itself is rotatably supported on an axle that defines the shift axis 38.

Figure 7:
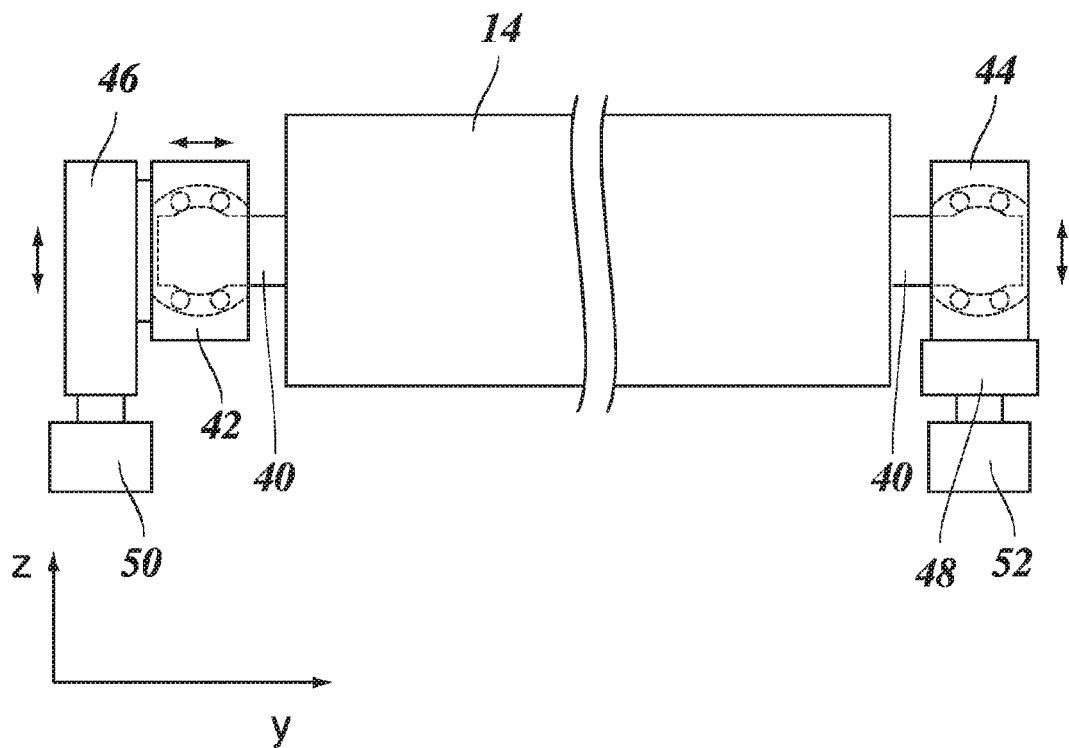
FIG. 7 is a schematic view of a bearing structure and an adjustment mechanism for a roller.

FIG. 7 shows an alternative bearing structure which provides more flexibility and is therefore preferred in the framework of to the invention. As is shown in FIG. 7, the roller 14 has axles 40 projecting from both ends of the roller. Each axle 40 is rotatably supported in a bearing 42 and 44, respectively. The bearing 42 on the left side in FIG. 7 is held by an actuator 46 that induces a lateral movement of the bearing, i.e. a movement in y-direction. Since the connections between the axles 40 of the roller and the bearings 42, 44 are rigid in y-direction, the movements of the actuator 46 are translated into corresponding lateral movements of the roller 14 and the bearing 44. For this reason, the bearing 44 is slidably supported on a guide block 48. The actuator 46 and the guide block 48 are supported on respective actuators 50, 52, which can induce vertical movements of the bearings 42, 44, i.e. movements in z-direction. The actuators 50 and 52 are controlled separately, so that their movements may be independent from one another. Consequently, the bearings 42, 44 should have a construction that permits minor angular movements of the axles 40 relative to the bearings. This is why the bearings 42 and 44 are formed by universal joints in the example shown in FIG. 7.

By appropriately controlling the actuators 50, 52 and 46, the roller 14 may be moved in all three degrees of freedom in the y-z-plane (i.e. translations in y-direction, translations in z-directions and rotations in the y-z-plane).

Thus, the bearing structure shown in FIG. 7 may be used for both, controlling the lateral shift of the roller 14 and controlling the tilt movement of the roller about any desired axis that is normal to plane of the drawing in FIG. 7, including in particular the tilt axis 38 shown in FIG. 6.

As an alternative, the vertical actuators 50, 52 may be used to tilt the roller 14 about the tilt axis 36 shown in FIG. 5, and the horizontal actuator 46 may be used to compensate for the lateral shift of the belt edge (by the distance d) that has been shown in FIG. 5.

A bearing structure identical with the one shown in FIG. 7 may also be used for the roller 12 at the other end of the belt. However, since it will generally not be necessary to tilt that roller 12, the Vertical actuators 50, 52 may be replaced by rigid supports.

The actuators 46, 50 and 52 may be of any suitable type and may for example be formed by electro-mechanical transducers such as magnetic actuators, piezos and the like.

An electronic control system and a method of controlling the actuators for the rollers 12, 14 will now be described in conjunction with FIGS. 8 to 10.

Figure 8:
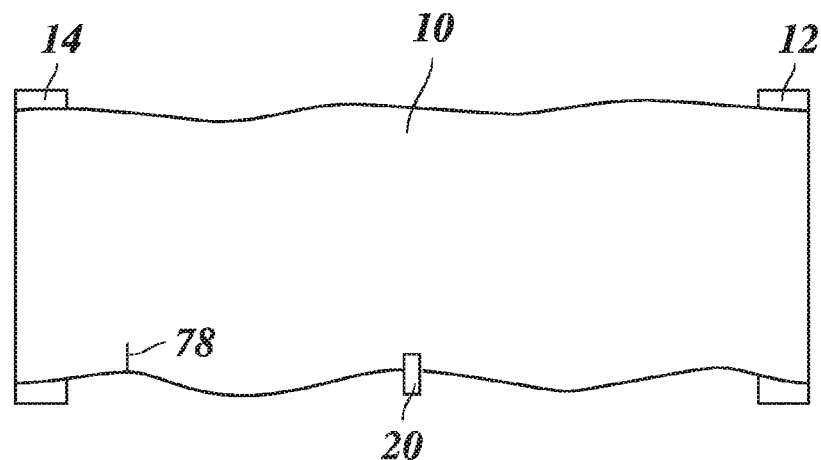
FIG. 8 is a top plan view of a belt transport system, for illustrating the effects of a non-straight belt edge.

FIG. 8 illustrates a problem that has to be dealt with when the lateral position of the belt 10 shall be controlled with extremely high accuracy. This problem results from the fact, that the edges of the belt 10 will in general not be perfectly straight but will have a somewhat curved shape as shown (exaggeratedly) in FIG. 8. Consequently, the lateral belt edge position detected by the belt edge detector 20 includes an error that is due to the curved shape of the belt edge. When the control system would simply tend to keep the detected position of the belt edge constant, then the entire belt 10 (and the sheets 30 conveyed thereon) would be subject to lateral movements that follow the curvature of the belt edge. However, since the curvature-induced lateral movements of the belt edge are periodic with a period Tb that corresponds to one complete revolution of the belt 10, it is possible to measure the shape of the belt edge and to calculate the corresponding movements beforehand and to subtract them from the detection result obtained with the belt edge detector 20 before the signal is used for feedback-controlling the actuators 46, 50 and 52.

Another periodic perturbation may be produced by manufacturing tolerances in the bearings 42, 44 which may, in particular, result in a certain wobble of the roller 14 (and also the roller 12) in lateral direction and also in certain tilt movements of the roller. These movements of the rollers will be translated into certain lateral movements of the belt 10, as has been described above. The corresponding oscillations in the lateral position of the belt edge will have a period corresponding to one complete revolution of the rollers 12, 14.

Figure 9:
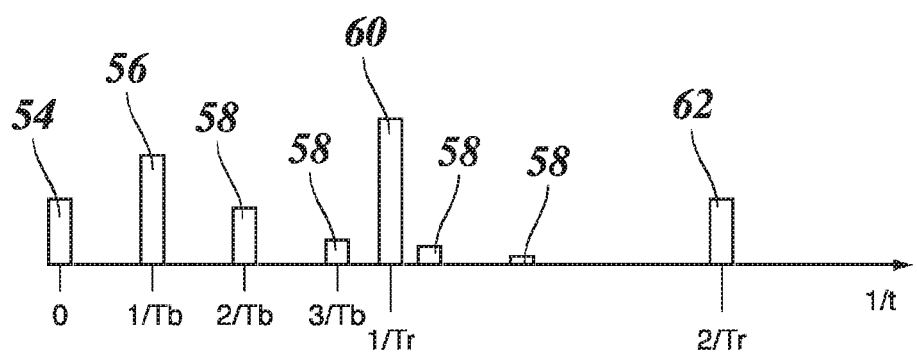
FIG. 9 shows a spectrum of periodic fluctuations in the lateral position of the belt edge.

FIG. 9 illustrates a spectrum of such periodic perturbations in the form of a bar diagram. The spectrum may be obtained by sampling the lateral position of the belt edge as detected by the belt edge detector 20 over at least one period Tb (or preferably an integral multiple thereof) and then applying a discrete Fourier transformation. In FIG. 9, the frequency or inverse period 1/t is given on the horizontal axis, and each Fourier component is represented by a bar at the respective frequency.

The bar 54 at the frequency 0 corresponds to the position of the belt edge as averaged over the entire sampling period. The bar 56 at the frequency 1/Tb indicates the (sinusoidal) base component of the fluctuations with the period Tb, and the bars 58 at frequencies 2/Tb, 3/Tb etc. represent higher harmonics. Similarly, a bar 60 at the frequency 1/Tr represents the base component of fluctuations with the periodicity Tr of the rollers 12, 14. A bar 62 represents the second harmonic thereof. Higher harmonics may be calculated but have not been shown in FIG. 9.

Figure 10:
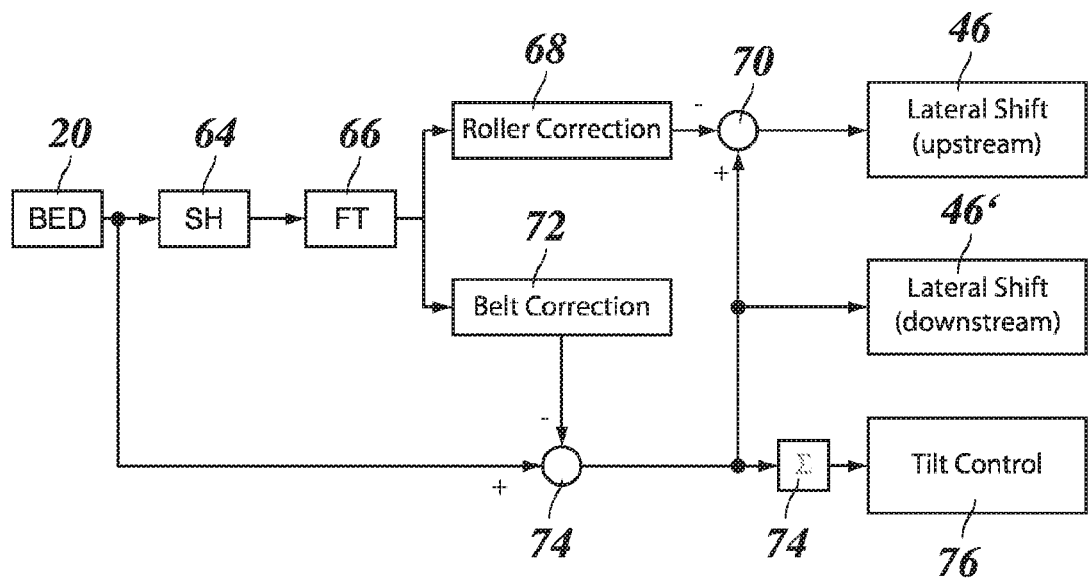
FIG. 10 is a block diagram of a control system for the belt transport system according to the invention.

FIG. 10 is a block diagram of a control system that may be used for controlling the actuators for the bearings of the rollers 12 and 14.

The belt edge detector 20 delivers a detection signal that indicates the y-position of the belt edge to the sample/hold-circuit 64 where the detection signal is continuously and repeatedly sampled, each sampling period having the length Tr. The sampled data set for each period is then transmitted to a Fourier transformation stage 66, where a Fourier spectrum of the type shown in FIG. 9 is calculated.

From this spectrum, a roller correction stage 68 extracts the components that have periods of Tr and higher harmonics thereof. These Fourier components are used for synthesizing a correction signal that represents the effect of all fluctuations that are caused by the bearings of the rollers 12, 14. In the example shown, only the roller 14 is used for compensating these fluctuations. Consequently, the correction signal calculated by the roller correction stage 68 is inverted in sign at a summation point 70 and is then used for controlling the actuator 46 for the roller 14.

A belt correction stage 72 extracts the components of the Fourier spectrum that have the period Tb and higher harmonics and synthesises from these Fourier components a correction signal that represents the shape of the belt edge. A corresponding correction signal is sent to a summation point 74 and is subtracted from the detection signal that has been delivered by the belt edge detector 20. The difference, detection signal minus correction signal, is then delivered to the summation point 70 and added to the control signal for the actuator 46. Simultaneously, this difference is supplied to an actuator 46' which controls the lateral position of the roller 12.

Preferably, all actuators are disabled as long as the sample/hold-circuit 64 and the Fourier transformation stage 66 are used for recording the spectrum which will then be permanently stored for use by the correction circuits. The recording step may however be repeated from time to time, so that the spectrum will be updated continuously and may therefore reflect any possible changes in the properties of the roller bearings or in the shape of the belt edge. The part of the spectrum that relates to the shape of the belt edge may also be recorded permanently during feedback-controlled operation of the actuators.

As is shown in FIG. 8, the belt 10 has a reference mark 78 that is detectable by the belt edge detector 20 to provide a reference signal which serves as a start signal for the sample/hold-circuit 64 and as a synchronisation signal for the belt correction stage 72. A similar synchronisation signal may be derived from the drive motor for the rollers 12, 14 for synchronising the roller correction stage 68.

Thus, when the belt transport system and the control system operate, any deviations of the belt edge from its target position are immediately cancelled by the appropriate lateral shift movements of the rollers 12, 14. Further, the signal delivered by the summation point 74 is subjected to certain filter procedures such as integration, averaging and the like in a filter 76 and is then transmitted to a tilt control stage 76 which controls the actuators 46, 50 and 52 so as to effect the tilt movement of the roller 14. This tilt control stage 76 assures the long-term stability of the control system and assures that the rollers 12 and 14 need not be shifted beyond their limits.

In the example shown in FIG. 10, only the shift movement of the roller 14 is used for compensating the periodic perturbations that are caused by the roller bearings. Of course, it would also be possible to use the horizontal actuators 46, 46' of both rollers 12, 14 for that purpose.

In yet another embodiment, two belt edge detectors may be provided for detecting the belt edge in the vicinity of both rollers 12, 14, so that the lateral shift movements of each roller may be controlled on the basis of the detection signal from the detector associated therewith.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of adjusting a lateral position of an endless belt that is passed around at least two rollers, comprising the steps of:
   controlling a tilt position of a first roller of the at least two rollers; and
   adjusting a lateral position of the first roller, wherein the lateral position of the first roller is adjusted in combination with controlling the tilt position of the first roller,
   wherein the first roller of the rollers is tilted about a tilt axis that is arranged offset relative to the axis of rotation of the first roller towards a line where the belt leaves the peripheral surface of the first roller.

2. The method according to claim 1, further comprising the step of:
   adjusting a lateral position of a second roller of the at least two rollers.

3. The method according to claim 2, wherein the lateral positions of the first roller and the second roller are controlled synchronously.

4. The method according to claim 2, comprising the steps of:
   detecting a lateral position of an edge of the belt by means of a belt edge detector; and
   feedback-controlling the lateral position of the belt by adjusting both, the tilt position and the lateral position of the first roller of the at least two rollers.

5. The method according to claim 4, wherein a detection signal of belt edge detector is integrated and/or averaged and/or filtered before it is used for controlling the tilt position of the first roller of the at least two rollers.

6. The method according to claim 5, wherein the detection signal of the belt edge detector is corrected for irregularities in the shape of the belt edge before the signal is used for adjusting the lateral position of the first roller of the at least two rollers.

7. The method according to claim 4, comprising the steps of:
   determining periodic fluctuations in the lateral position of the second roller and/or the belt with a periodicity corresponding to the rotation of the second roller; and
   controlling the lateral position of the second roller for compensating these fluctuations.

8. The method according to claim 1, comprising the steps of:
   detecting a lateral position of an edge of the belt by means of a belt edge detector; and
   feedback-controlling the lateral position of the belt by adjusting both, the tilt position and the lateral position of the first roller of the at least two rollers.

9. The method according to claim 8, wherein a detection signal of belt edge detector is integrated and/or averaged and/or filtered before it is used for controlling the tilt position of the first roller of the at least two rollers.

10. The method according to claim 9, wherein the detection signal of the belt edge detector is corrected for irregularities in the shape of the belt edge before the signal is used for adjusting the lateral position of the first roller of the at least two rollers.

11. The method according to claim 10, comprising the steps of:
   determining periodic fluctuations in the lateral position of the first roller and/or the belt with a periodicity corresponding to the rotation of the first roller; and
   controlling the lateral position of the first roller for compensating these fluctuations.

12. The method according to claim 9, comprising the steps of:
   determining periodic fluctuations in the lateral position of the first roller and/or the belt with a periodicity corresponding to the rotation of the first roller; and
   controlling the lateral position of the first roller for compensating these fluctuations.

13. The method according to claim 8, comprising the steps of:
   determining periodic fluctuations in the lateral position of the first roller and/or the belt with a periodicity corresponding to the rotation of the first roller; and
   controlling the lateral position of the first roller for compensating these fluctuations.

14. The method according to claim 1, wherein the first roller is tilted by adjusting the positions of bearings at opposite ends of the first roller in a direction (y) in parallel with the axis of rotation of that roller and in a direction (z) that is orthogonal to the tilt axis.

15. A belt transport system comprising:
   an endless belt passed around at least two rollers; and
   an adjusting mechanism configured to adjust the lateral position of the endless belt in a direction (y) parallel with the axes of rotation of the rollers, said adjusting mechanism including:
      a tilting mechanism configured to tilt a first roller of the at least two rollers about an axis that is orthogonal to the axis of rotation of that roller; and
      an actuator for adjusting the lateral position of the first roller in said direction (y) in parallel with the axes of rotation of the rollers,
   wherein the adjusting mechanism is adapted to tilt said first roller about a tilt axis that is arranged offset from the axis of rotation of the first roller towards a line where the belt leaves the peripheral surface of the first roller.

16. The belt transport system according to claim 15, wherein the adjusting mechanism comprises actuators for moving bearings at opposite ends of the first roller of the at least two rollers independently of one another in a direction (z) that is orthogonal to the tilt axis.

17. The belt transport system according to claim 15, wherein the adjusting mechanism further comprises an actuator for adjusting the lateral position of a second roller of the at least two rollers in said direction (y) in parallel with the axes of rotation of the rollers.

18. A belt transport system comprising:
   an endless belt passed around at least two rollers; and
   an adjusting mechanism configured to adjust the lateral position of the endless belt in a direction (y) parallel with the axes of rotation of the rollers, said adjusting mechanism including:
      an actuator configured to tilt a first roller of the at least two rollers about an axis that is orthogonal to the axis of rotation of that roller; and an actuator for adjusting the lateral position of the first roller in said direction (y) in parallel with the axes of rotation of the rollers, wherein the adjusting mechanism is adapted to tilt said first roller about a tilt axis that is arranged offset from the axis of rotation of the first roller towards a line where the belt leaves the peripheral surface of the first roller.

* * * * *